United States Patent Office 2,798,885
Patented July 9, 1957

2,798,885
N-METHYL CARBAMIC ACID ESTERS OF ACETYLENIC CARBINOLS

Hellmut Ensslin and Konrad Meier, Basel, Switzerland, assignors to Ciba Pharmaceutical Products, Inc., Summit, N. J.

No Drawing. Application February 12, 1953, Serial No. 336,650

Claims priority, application Switzerland February 22, 1952

8 Claims. (Cl. 260—482)

The present invention provides new carbamic acid esters of the formula

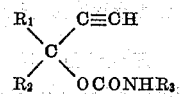

in which $R_1$ and $R_2$ each represent a monovalent aliphatic or cycloaliphatic hydrocarbon radical or together represent a divalent aliphatic hydrocarbon radical such, for example, as an alkyl, cycloalkyl or alkylene radical, such as, for example, methyl, ethyl, propyl, butyl, isobutyl, pentyl, hexyl, heptyl, cyclopropyl, cyclopentyl, cyclohexyl, butylene-(1,4), pentylene-(1,5) or hexylene-(1,6), and $R_3$ represents an aliphatic hydrocarbon radical, especially a lower alkyl radical, such as methyl or ethyl.

The carbinols from which the above esters are derived are in part known. Among these carbinols ethinyl-methyl-ethyl-carbinol is used as a narcotic. The new carbamic acid esters of the invention possess sedative and narcotic activities and can be used as sedatives or narcotics. As compared with the corresponding carbinols they exhibit a greater therapeutic breadth and, at equal doses, a stronger action. Many of them are solids and can be tableted.

The new esters are made by reacting a carbinol of the formula

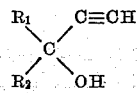

with an isocyanate of the formula $$R_3\text{—NCO}$$

The latter may be formed in the course of the reaction.

The following examples illustrate the invention, the parts being by weight unless otherwise stated and the relationship of parts by weight to parts by volume being the same as that of the gram to the cubic centimeter:

Example 1

12.9 parts of methyl-isocyanate are introduced dropwise with the exclusion of moisture into 62.5 parts of ethinyl-n-pentyl-methyl-carbinol. The temperature rises to 29° C. After allowing the mixture to stand over night at room temperature, 1.5 parts of anhydrous potassium acetate and 4 parts by volume of triethylamine are added, the temperature again rising for a short time to 32° C. After allowing the mixture to stand for 6 days at room temperature the odor of the isocyanate will have disappeared.

The reaction product is then taken up in ether, washed twice with a small amount of water, three times with dilute hydrochloric acid and again with water, dried by means of sodium sulfate and the ether is distilled off. The excess of ethinyl carbinol (boiling at 78–91° C. under 13 mm. pressure) is then distilled off under a vacuum produced with a water pump, and the residue is distilled under a high vacuum. The ester of N-methyl-carbamic acid with ethinyl-n-pentyl-methyl-carbinol of the formula

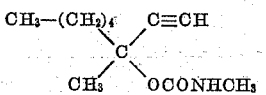

boils at 105–106° C. under 0.35 mm. pressure of mercury. It is a viscous colorless oil.

Example 2

13.2 parts of methyl-isocyanate are reacted with 58.5 parts of ethinyl-isobutyl-methyl-carbinol in the manner described in Example 1. The resulting ester of methyl carbamic acid with ethinyl-isobutyl-methyl-carbinol of the formula

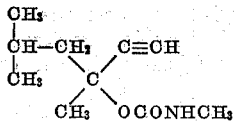

boils at 79–80.5° C. under 0.35–0.4 mm. pressure of mercury, and is a colorless somewhat viscous oil.

Example 3

13.21 parts of methyl-isocyanate are reacted in the manner described in Example 1 with 65 parts of ethinyl-diisopropyl-carbinol.

The ester of methyl-carbamic acid with ethinyl-diisopropyl-carbinol of the formula

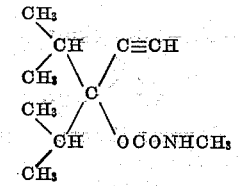

is recrystallized from petroleum ether and melts at 38–40° C.

Example 4

13 parts of methyl-isocyanate are reacted with 64 parts of ethinyl-di-n-propyl-carbinol in the manner described in Example 1. The ester of methyl-carbamic acid with ethinyl-di-n-propyl-carbinol of the formula

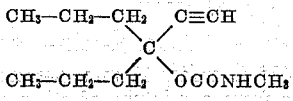

crystallizes from petroleum ether in the form of long flat prisms melting at 57.5–58.5° C.

Example 5

8.67 parts of methyl-isocyanate are reacted with 35.3 parts of ethinyl-ethyl-methyl-carbinol in the manner described in Example 1. The methyl-carbamic acid ester of the formula

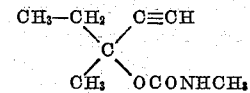

boils at 103° C. under 11 mm. pressure of mercury, and melts at 54–55° C. after recrystallization from methyl cyclohexane.

Example 6

14.1 parts of methyl-isocyanate are reacted with 51.3 parts of ethinyl-diethyl-carbinol in the manner described in Example 1. The resulting methyl-carbamic acid ester of the formula $$\begin{array}{c}CH_3-CH_2\\ \phantom{CH_3-CH_2}\diagdown\\ CH_3-CH_2\diagup C\diagdown OCONHCH_3\end{array}\quad \begin{array}{c}C\equiv CH\\ \diagup\\ \phantom{OCONHCH_3}\end{array}$$

boils at 84–85° C. under 0.3 mm. pressure of mercury, and is a colorless oil.

Example 7

12.9 parts of methyl-isocyanate are reacted with 43 parts of 1-ethinyl-cyclohexanol in the manner described in Example 1. The resulting methyl-carbamic acid ester of the formula $$\text{cyclohexyl}\diagdown\diagup \begin{array}{c}C\equiv CH\\ OCONHCH_3\end{array}$$

is recrystallized from a mixture of carbon tetrachloride and petroleum ether and then melts at 57–58° C.

Example 8

21.5 parts of ethyl-isocyanate are reacted with 40 parts of methyl-ethyl-ethinyl-carbinol as described in Example 1. The resulting ethyl-carbamic acid ester of the formula $$\begin{array}{c}CH_3-CH_2\\ \phantom{CH_3}\diagdown\\ CH_3\diagup C\diagdown OCONH-CH_2-CH_3\end{array}\quad \begin{array}{c}C\equiv CH\\ \diagup\\ \phantom{OCONH}\end{array}$$

boils at 107–108° C. under 13 mm. pressure of mercury and melts at 25° C.

Example 9

17.8 parts of ethyl-isocyanate are reacted with 52.5 parts of amyl-methyl-ethinyl-carbinol as described in Example 1. The resulting ethyl-carbamic acid ester of the formula $$\begin{array}{c}CH_3-CH_2-CH_2-CH_2-CH_2\\ \phantom{CH_3}\diagdown\\ CH_3\diagup C\diagdown O-CO-NH-CH_2-CH_3\end{array}\quad \begin{array}{c}C\equiv CH\\ \diagup\\ \phantom{O-CO}\end{array}$$

distils at 137–138° C. under 12 mm. pressure of mercury in the form of a colorless oil.

Example 10

8.9 parts of ethyl-isocyanate, 20 parts of ethinyl-cyclohexanol and 3 parts by volume of triethylamine are placed into an ampoule which is then sealed by fusion, and allowed to stand at 60° C. for 10 days. The product is worked up as in Example 1. The ethyl-carbamic acid ester of ethinyl-cyclohexanol of the formula $$\text{cyclohexyl}\diagdown\diagup \begin{array}{c}C\equiv CH\\ OCONH-CH_2-CH_3\end{array}$$

boils at 135–142° C. under 11 mm. pressure of mercury and crystallizes from a mixture of ether and petroleum ether in colorless prisms of melting point 64–65° C.

Example 11

8.3 parts of allyl-isocyanate are allowed to stand at 60° C. for 1 week in a fusion-sealed ampoule together with 20 parts of amyl-methyl-ethinyl-carbinol and 2 parts by volume of triethylamine. The resulting allyl-carbamic acid ester of amyl-methyl-ethinyl-carbinol of the formula $$\begin{array}{c}CH_3-CH_2-CH_2-CH_2-CH_2\\ \phantom{CH_3}\diagdown\\ CH_3\diagup C\diagdown OCONH-CH_2-CH=CH_2\end{array}\quad \begin{array}{c}C\equiv CH\\ \diagup\\ \phantom{OCONH}\end{array}$$

boils at 87° C. under 0.08 mm. pressure of mercury.

Example 12

6.5 parts of n-propyl-isocyanate are reacted with 11.8 parts of methyl-ethyl-ethinyl-carbinol as described in Example 10. The n-propyl-carbamic acid ester of the formula $$\begin{array}{c}CH_3-CH_2\\ \phantom{CH_3}\diagdown\\ CH_3\diagup C\diagdown OCONH-CH_2-CH_2-CH_3\end{array}\quad \begin{array}{c}C\equiv CH\\ \diagup\\ \phantom{OCONH}\end{array}$$

boils at 114–116.5° C. under 13 mm. pressure of mercury and melts, after recrystallization from ligroin, at 35.5–36.5° C.

Example 13

12.75 parts of i-propyl-isocyanate are reacted with 20 parts by weight of methyl-ethyl-ethinyl-carbinol and 3 parts by volume of triethylamine as described in Example 10. The i-propyl-carbamic acid ester of the formula $$\begin{array}{c}CH_3-CH_2\\ \phantom{CH_3}\diagdown\\ CH_3\diagup C\diagdown OCONH-CH(CH_3)_2\end{array}\quad \begin{array}{c}C\equiv CH\\ \diagup\\ \phantom{OCONH}\end{array}$$

boils at 105° C. under 11 mm. pressure and melts, after recrystallization from a mixture of ether and petroleum ether, at 46–47° C.

Example 14

11.16 parts of i-propyl-isocyanate are reacted with 24.5 parts of amyl-methyl-ethinyl-carbinol in the presence of 3 parts by volume of triethylamine as described in Example 10. The i-propyl-carbamic acid ester of the formula $$\begin{array}{c}CH_3-CH_2-CH_2-CH_2-CH_2\\ \phantom{CH_3}\diagdown\\ CH_3\diagup C\diagdown OCONH-CH(CH_3)_2\end{array}\quad \begin{array}{c}C\equiv CH\\ \diagup\\ \phantom{OCONH}\end{array}$$

distils at 139–140° C. under 11 mm. or at 75° C. under 0.09 mm. pressure of mercury.

Example 15

13.2 parts of n-butyl-isocyanate are reacted with 17.4 parts of methyl-ethyl-ethinyl-carbinol in the presence of 3 parts by volume of triethylamine as described in Example 10. The resulting n-butyl-carbamic acid ester of the formula $$\begin{array}{c}CH_3-CH_2\\ \phantom{CH_3}\diagdown\\ CH_3\diagup C\diagdown OCONH-CH_2-CH_2-CH_2-CH_3\end{array}\quad \begin{array}{c}C\equiv CH\\ \diagup\\ \phantom{OCONH}\end{array}$$

boils at 128° C. under 11 mm. pressure of mercury and melts at 25–27° C.

Example 16

13.2 parts of n-butyl-isocyanate are reacted with 22 parts of ethinyl-cyclohexanol in the presence of 3 parts by volume of triethylamine. The resulting n-butyl-carbamic acid ester of the formula $$\text{cyclohexyl}\diagdown\diagup \begin{array}{c}C\equiv CH\\ OCONH-CH_2-CH_2-CH_2-CH_3\end{array}$$

boils at 159–162° C. under 11 mm. pressure of mercury and melts, after recrystallization from a mixture of ether and petroleum ether, at 54.5–55.5° C.

Example 17

9.9 parts of i-butyl-isocyanate are reacted with 14.7 parts of methyl-ethyl-ethinyl-carbinol as described in Example 10. The resulting i-butyl-carbamic acid ester of the formula $$\begin{array}{c}CH_3-CH_2\\ \phantom{CH_3}\diagdown\\ CH_3\diagup C\diagdown OCONH-CH_2-CH(CH_3)_2\end{array}\quad \begin{array}{c}C\equiv CH\\ \diagup\\ \phantom{OCONH}\end{array}$$

Example 18

10 parts of i-butyl-isocyanate are reacted with 15 parts of amyl-methyl-ethinyl-carbinol in the presence of 3 parts by volume of triethylamine as described in Example 10. The resulting i-butyl-carbamic acid ester of the formula

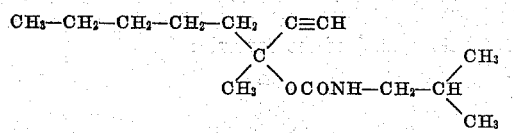

distils at 152–154° C. under 11 mm. pressure of mercury.

Example 19

9.9 parts of i-butyl-isocyanate are reacted with 15 parts of ethinyl-cyclohexanol as described in Example 10. The resulting i-butyl-carbamic acid-ester of the formula

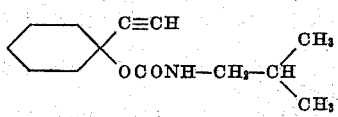

boils at 155–157° C. under 11 mm. pressure of mercury and crystallizes from a mixture of ether and petroleum ether in flat prisms of melting point 69–70° C.

Example 20

18.5 parts of ethinyl-cycloheptanol boiling at 40–41° C. under 0.3 mm. pressure of mercury (prepared by adding dropwise 112 parts of cycloheptanone to a solution of 1 equivalent of sodium acetylene in 1500 parts by volume of liquid ammonia while acetylene is passed through) are allowed to stand for a week at 60° C. in a sealed vessel with 5.7 parts of methylisocyanate and 2 parts by volume of triethylamine, as described in Example 10. On working up in the usual manner there is obtained the methyl-carbamic acid ester of ethinyl-cycloheptanol of the formula

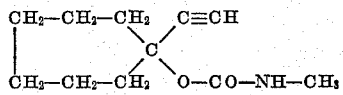

as a viscous oil which boils at 90° C. under 0.07 mm. pressure of mercury.

Example 21

24 parts of ethinyl-dimethyl-carbinol are reacted with 16 parts of methylisocyanate and 2 parts by volume of triethylamine, as described in Example 10. After working up in the usual manner the crystalline crude product is purified by recrystallizing it from a mixture of ether and petroleum ether. The resulting methylcarbamic acid ester of ethinyl-dimethyl-carbinol of the formula

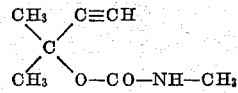

melts at 69.5–70° C.

Example 22

9 parts of ethinyl-dimethyl-carbinol are reacted as described in Example 10 with 7.1 parts of ethylisocyanate in the presence of 2 parts by volume of triethylamine. The resulting ethyl-carbamic acid ester of ethinyl-dimethyl-carbinol of the formula

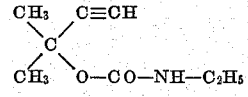

is recrystallized from a mixture of ether and petroleum ether and then melts at 70–71° C.

Example 23

69 parts of sodium azide, activated with hydrazine, are suspended in a flask equipped with a stirrer in 400 parts by volume of absolute benzene with exclusion of moisture and 78.5 parts of acetyl chloride added dropwise at 20–25° C. in the course of an hour, while stirring. After stirring for another four hours at 25° C. the reaction of the mixture is slightly acid. 112 parts of ethinyl-methyl-ethyl-carbinol and 5 parts by volume of triethylamine are added and the mixture heated at 40–80° C. for 4 days, that is to say, for two days at 40–45° C. with slow raising of the temperature to the final 80° C. during the remaining two days. This causes the acetyl azide present to decay into nitrogen and methyl isocyanate, the latter combining with the carbinol to form the desired urethane. Water is added to the mixture, the benzene solution separated, the solvent distilled off under reduced pressure and the crystalline residue fractionated in vacuo. The resulting methyl-carbamic acid ester of ethinyl-methyl-ethyl-carbinol of the formula

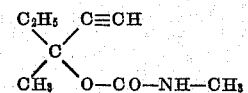

distils at 118–119° C. under 17 mm. pressure of mercury and crystallizes instantly. It is identical with the product described in Example 5.

Example 24

16.5 parts of ethinyl-methyl-cyclopropyl-carbinol are heated at 50–60° C. for 8 days with 10.7 parts of methyl-isocyanate in the presence of 1 part by volume of triethylamine in a closed vessel as described in Example 10. After working up as described in Example 1, the resulting methylcarbamic acid ester of ethinyl-methyl-cyclopropyl-carbinol of the formula

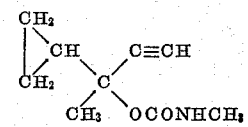

is recrystallized from a mixture of ether and petroleum ether. Its colorless needles melt at 70–71° C.

Example 25

25.5 parts of acetyl chloride in 200 parts by volume of benzene are reacted with 25 parts of activated sodium azide as described in Example 23. After stirring for 6 hours at room temperature 36 parts of ethinyl cyclopentanol and 7 parts by volume of triethylamine are added. The whole is then stirred at 40–45° C. for 50 hours, at 50–60° C. for 24 hours, and at 60–80° C. for 10 hours. The product is worked up as in Example 23. The crystalline crude product is recrystallized for purification from a mixture of acetone and petroleum ether. The resulting methyl-carbamic acid ester of ethinyl-cyclopentanol of the formula

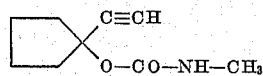

forms coarse crystals of melting point 92.5–93° C.

Example 26

17.3 parts of acetyl chloride are reacted in 150 parts by volume of benzene with 16.2 parts of activated sodium azide as indicated in Example 23. After stirring at room temperature for 6 hours, 38 parts of ethinyl-methyl-cyclohexyl carbinol and 5 parts by volume of triethylamine are added. The whole is then heated as described in Example 25. After the usual working up, the product is purified by distillation under a high vacuum. There is thus obtained the methyl-carbamic acid ester of ethinyl-methyl-cyclohexyl-carbinol of the formula

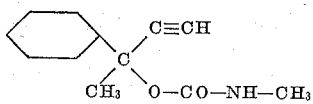

which boils at 82–86° C. under 0.04 mm. pressure of mercury and melts at 78.5–79.5° C. after recrystallization from a mixture of ether and petroleum ether.

What is claimed is:
1. A compound of the formula:

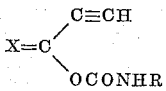

wherein X is a member selected from the group consisting of (a) two monovalent aliphatic hydrocarbon radicals containing 1 to 7 carbon atoms, (b) two monovalent cycloaliphatic hydrocarbon radicals containing 3 to 6 carbon atoms, (c) a monovalent aliphatic hydrocarbon radical containing 1 to 7 carbon atoms and a monovalent cycloaliphatic hydrocarbon radical containing 3 to 6 carbon atoms, and (d) a bivalent aliphatic hydrocarbon radical containing 4 to 6 carbon atoms, and R stands for a lower alkyl radical, said radicals (a), (b), (c) and (d) being saturated.

2. A compound of the formula:

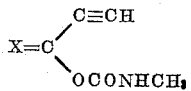

wherein X is a member selected from the group consisting of (a) two monovalent aliphatic hydrocarbon radicals containing 1 to 7 carbon atoms, (b) two monovalent cycloaliphatic hydrocarbon radicals containing 3 to 6 carbon atoms, (c) a monovalent aliphatic hydrocarbon radical containing 1 to 7 carbon atoms and a monovalent cycloaliphatic hydrocarbon radical containing 3 to 6 carbon atoms, and (d) a bivalent aliphatic hydorcarbon radical containing 4 to 6 carbon atoms, said radicals (a), (b), (c) and (d) being saturated.

3. A compound of the formula:

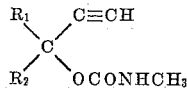

wherein $R_1$ and $R_2$ stand for alkyl radicals containing 1–7 carbon atoms.

4. The N-methylcarbamic acid ester of 1-ethinyl-cyclohexanol.

5. The N-methylcarbamic acid ester of ethinyl-n-pentyl-methyl-carbinol.

6. The N-methylcarbamic acid ester of ethinyl-ethyl-methyl-carbinol.

7. The N-methylcarbamic acid ester of ethinyl-dimethyl-carbinol.

8. The N-ethylcarbamic acid ester of ethinyl-dimethyl-carbinol.

References Cited in the file of this patent

Pape et al.: Arch Biochem Physics 33, 482–3 (1950).
Peterson: Ann, 562, 209–29 (1949).
Young et al.: J. A. C. S. 73, 777–9 (1951).